United States Patent [19]

Massey, Jr. et al.

[11] Patent Number: 5,016,244

[45] Date of Patent: May 14, 1991

[54] METHOD FOR CONTROLLING FAILOVER BETWEEN REDUNDANT NETWORK INTERFACE MODULES

[75] Inventors: W. Russell Massey, Jr., Levittown; Renee Drobish, Dresher; Paul F. McLaughlin, Hatfield, all of Pa.

[73] Assignee: Honeywell Inc., Minneapolis, Minn.

[21] Appl. No.: 404,748

[22] Filed: Sep. 8, 1989

[51] Int. Cl.[5] .............................................. H04J 3/14
[52] U.S. Cl. ..................................... 370/16; 370/85.4; 370/85.13; 370/94.3
[58] Field of Search .................... 370/85.4, 85.5, 85.9, 370/85.13, 85.11, 85.14, 85.15, 16, 60, 60.1, 94.1, 94.3; 371/8.1, 11.1; 340/825.01, 827, 825.02, 825.5, 825.51, 825.52

[56] References Cited

U.S. PATENT DOCUMENTS

| | | | |
|---|---|---|---|
| 4,410,983 | 10/1983 | Cope | 370/85.9 |
| 4,596,012 | 6/1986 | Reed | 370/16 |
| 4,797,881 | 1/1989 | Ben-Artzi | 370/85.4 |
| 4,831,617 | 5/1989 | Iwasaki | 370/16 |
| 4,845,609 | 7/1989 | Lighthart et al. | 370/85.4 |
| 4,847,837 | 7/1989 | Morales et al. | 370/16 |

Primary Examiner—Douglas W. Olms
Assistant Examiner—Alpus H. Hsu
Attorney, Agent, or Firm—A. Sapelli; D. Lenkszus; A. Medved

[57] ABSTRACT

A method by which redundant network interface modules (NIMs) interconnecting the communication buses of two local area networks communicate with one another at predetermined time intervals over the communication buses of both networks. A first NIM of a redundant pair of NIMs is designated as the primary and a second NIM of the redundant pair is designated as the secondary. Contents of the information communicated between the NIMs over the communication bus of the first network includes the status of the transmitting NIMs ability to communicate with the second network and the information communicated between the NIMs over the communication bus of the second network includes the status of the transmitting NIM's ability to communicate with the first network. Based on the information exchanged, the failure of the NIMs to communicate as scheduled, and the internal status of each NIM as understood by that NIM, the NIMs decide when failover from the primary NIM to the secondary NIM occurs.

12 Claims, 2 Drawing Sheets

|   |   | UCN FAIL | UCN OK | LCN FAIL | LCN OK | OUTCOME |
|---|---|---|---|---|---|---|
| 1 | P |   | X |   | X |   |
|   | S |   | X |   | X | NORMAL OPERATION |
| 2 | P | X |   |   | X | FAILOVER |
|   | S |   | X |   | X |   |
| 3 | P |   | X |   | X |   |
|   | S | X |   |   | X | SECONDARY TERMINATES |
| 4 | P |   | X | X |   | FAILOVER |
|   | S |   | X |   | X |   |
| 5 | P |   | X |   | X |   |
|   | S |   | X | X |   | SECONDARY TERMINATES |
| 6 | P | X |   |   | X | SECONDARY TERMINATES |
|   | S |   | X | X |   |   |
| 7 | P |   | X | X |   | NO ACTION |
|   | S |   | X | X |   |   |
| 8 | P |   | X | X |   | FAILOVER |
|   | S | X |   |   | X |   |
| 9 | P | X |   |   | X | NO ACTION |
|   | S | X |   |   | X |   |
| 10 | P |   | X |   | X | SECONDARY TERMINATES |
|    | S | X |   | X |   |   |
| 11 | P | X |   |   | X | SECONDARY TERMINATES |
|    | S | X |   | X |   |   |
| 12 | P | X |   | X |   | NO ACTION |
|    | S | X |   | X |   |   |
| 13 | P | X |   | X |   | FAILOVER |
|    | S | X |   |   | X |   |
| 14 | P | X |   | X |   | FAILOVER |
|    | S |   | X |   | X |   |
| 14 | P | X |   | X |   |   |
|    | S |   | X |   | X | FAILOVER |
| 15 | PRIMARY CRASH |   |   |   |   | FAILOVER |
| 16 | SECONDARY CRASH |   |   |   |   | PRIMARY HALTS COMMUNICATIONS WITH SECONDARY |
| 17 | P |   | X |   | X | PRIMARY AND SECONDARY CAN'T COMMUNICATE ON LCN |
|    | S |   | X |   | X | SECONDARY TERMINATES |

Fig. 2

METHOD FOR CONTROLLING FAILOVER BETWEEN REDUNDANT NETWORK INTERFACE MODULES

RELATED APPLICATIONS

The present application is related to the following:

(a) patent application Ser. No. 07/299,857, entitled "APPARATUS FOR TRACKING PREDETERMINED DATA FOR UPDATING A SECONDARY DATA BASE," by P. Gerhart, filed on Jan. 23, 1989;

(b) patent application Ser. No. 07/299,859, entitled "METHOD FOR CONTROL DATA BASE UPDATING OF A REDUNDANT PROCESSOR IN A PROCESS CONTROL SYSTEM," by P. McLaughlin et al, filed on Jan. 23, 1989;

(c) patent application, Ser. No. 07/259,064, entitled "A PRECISION A/D CONVERTER UTILIZING A MINIMUM OF INTERFACE INTERCONNECTIONS," by K. Kummer, filed on Oct. 18, 1988;

(d) patent application Ser. No. 07/153,753, entitled "APPARATUS AND METHOD FOR DETECTION OF AN OPEN THERMOCOUPLE IN A PROCESS CONTROL NETWORK," by K. Kummer, filed on Feb. 8, 1988;

(e) patent application Ser. No. 07/147,962, entitled "APPARATUS AND METHOD FOR COMPENSATION OF CIRCUIT GAIN ERRORS IN A PROCESS CONTROL NETWORK," by K. Kummer, filed on Jan. 25, 1988;

(f) patent application Ser. No. 07/121,561, entitled "APPARATUS AND METHOD FOR IDENTIFICATION OF MESSAGE INITIATION IN A PROCESS CONTROL NETWORK," by P. Gerhart et al, filed on Nov. 17, 1987;

(g) patent application Ser. No. 07/121,548, entitled "APPARATUS AND METHOD FOR A SECURE AND DIAGNOSABLE ANTI-JABBER COMMUNICATION CIRCUIT," by P. Gerhart, filed on Nov. 17, 1987;

(h) U.S. Pat. No. 4,607,256, issued on Aug. 19, 1986, (reissue applied for, reissue Ser. No. 07/186,230, filed on April 26, 1986); and (i) U.S. Pat. No. 4,296,464, issued on Oct. 20, 1981; all of above assigned to Honeywell Inc., the assignee of the present application.

BACKGROUND OF THE INVENTION

This invention relates to an apparatus for interfacing a plurality of signals to a processor, and more particularly, to an interface apparatus for interfacing a selectable plurality of different types of signals to a process control system.

In present day process control systems, interface devices are utilized to couple predetermined types of signals to the process control system, the predetermined types of signals being high-level analog, low-level analog, digital,.... Because of a rigid structure of these present day interface devices, only predetermined types of signals are permitted to be coupled to these present day interface devices. Also, the rigid structure provides only a predetermined number of control loops and secondly, only a predetermined number of input/output (I/O) for the control loops. Because some control tasks are more control processing intensive than others, and some tasks are more I/O intensive than others, it is desirable to interface selective tasks to the process control system via the interface device which will insure effective and efficient completion of these tasks, ie. control processing and I/O. However, the configuration provided by the structure of these present day interface devices is essentially fixed, ie., restricting what the user can do to efficiently tailor the configuration to specific user requirements, thereby limiting the number and types of tasks which can be coupled to the interface device.

The interface apparatus of the present invention permits a flexible quantity of different types of I/O signals to be interfaced (to the process control system) via the interface apparatus due to the architecture of the interface apparatus which essentially separates the processing of control from the I/O of control, thereby permitting the user to configure the system to meet a defined control strategy, without the limitations imposed by previous systems. Further, the processing of control can be eliminated altogether in the interface apparatus of the present invention. In this case the processing of control is performed by a controller external to the interface apparatus, thus permitting the interface apparatus to function as a data acquisition unit, thereby adding to the configuration flexibility.

SUMMARY OF THE INVENTION

Therefore, there is provided by the present invention, an apparatus for interfaces a plurality of signals to a processor. In a process control system, there is a plant control network for performing the overall supervision of a process being controlled. The plant control network has at least one external bus for operatively connecting a corresponding interface apparatus to the plant control network. Further, each interface apparatus interfaces with at least one predetermined field device, each field device being a type having a corresponding predetermined signal type. The interface apparatus comprises a controller, operatively connected to the bus for controlling the input/output (I/O) of the interface apparatus. At least one I/O module, operatively connected to the controller, preprocesses information signals to and from the predetermined field device connected to the I/O module. The preprocessing includes translating between the signal type of the field device and signals compatible with the controller.

Accordingly, it is an object of the present invention to provide an apparatus for interfacing a plurality of signals to a processor apparatus.

It is another object of the present invention to provide an apparatus for interfacing a plurality of different types of signals to a process apparatus.

It is still another object of the present invention to provide an apparatus for interfacing a plurality of different types of signals to a process control system.

It is a further object of the present invention to provide an apparatus for interfacing selectable quantities of different types of signals to a processor apparatus.

It is still a further object of the present invention to provide an apparatus for interfacing selectable quantities of different predefined types of signals to a processor apparatus.

It is yet another object of the present invention to provide an apparatus for interfacing selectable quantities of different predefined types of signals to a processor apparatus, wherein the selection of the signals is made by a user.

These and other objects of the present invention will become more apparent when taken in conjunction with

BRIEF DESCRIPTION OF THE DRAWINGS

FIG. 2 shows a block diagram of a process controller, the preferred embodiment of the interface apparatus of the present invention;

FIG. 3 shows a block diagram of a controller of the process controller of the preferred embodiment of the present invention;

FIG. 4 shows a block diagram of the I/O module of the preferred embodiment of the present invention; and FIG. 5 shows a block diagram of an alternative embodiment of a process control system incorporating the interface apparatus of the present invention.

DETAILED DESCRIPTION

Figure 1:
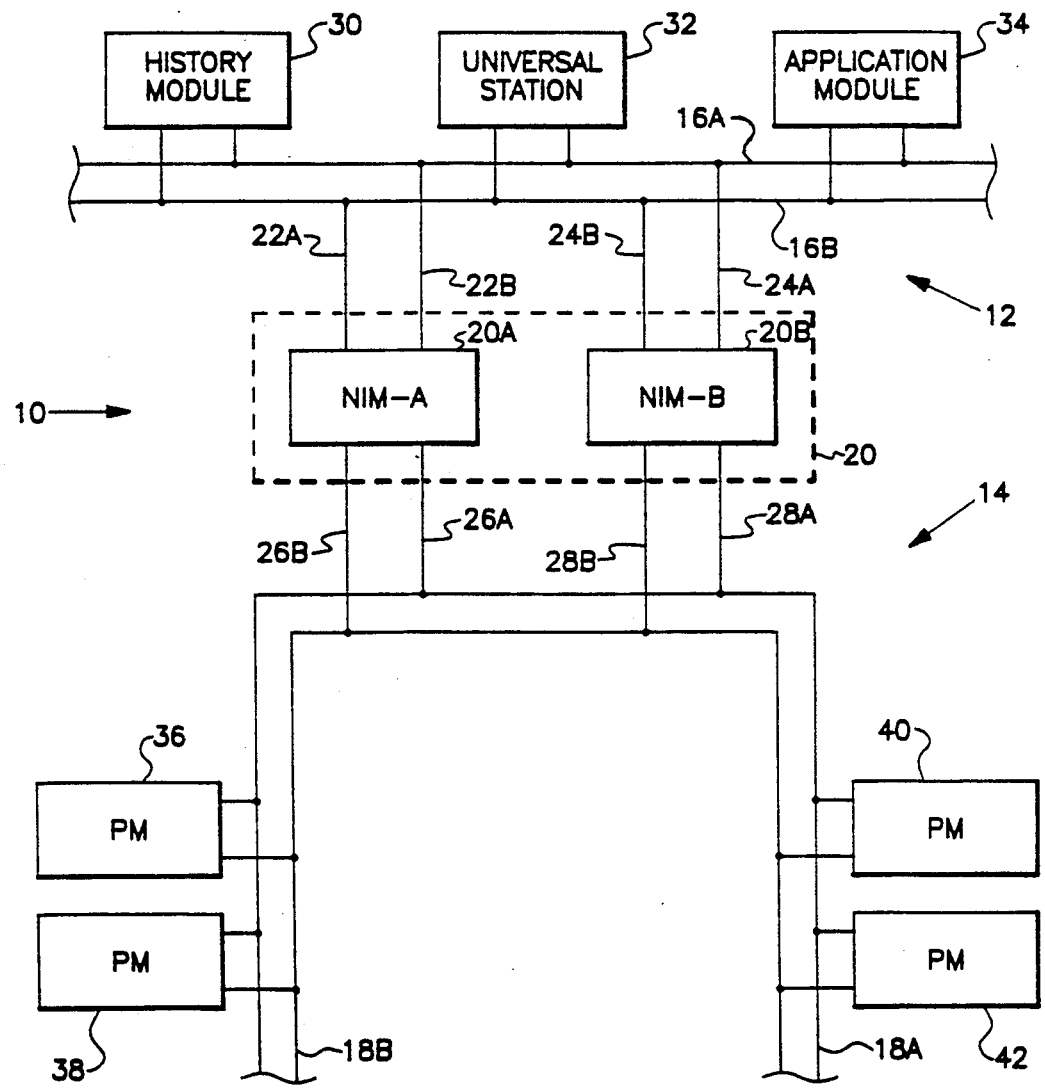
FIG. 1 shows a block diagram of a process control system in which an interface apparatus of the present invention may be utilized.

Before describing the interface apparatus of the present invention, it will be helpful in understanding a system environment in which the interface apparatus can be utilized. Referring to FIG. 1, there is shown a block diagram of a process control system 10 in which the interface apparatus of the present invention can be found. The process control system 10 includes a plant control network 11, and connected thereto is a data highway 12, which permits a process controller 20' to be connected thereto. In the present day process control system 10, additional process controllers 20' can be operatively connected to the plant control network 11 via a corresponding highway gateway 601 and a corresponding data highway 12. A process controller 20, the interface apparatus of the present invention, is operatively connected to the plant control network 11 via a universal control network (UCN) 14 to a network interface module (NIM) 602. In the preferred embodiment of the process control system 10, additional process controllers 20 can be operatively connected to the plant control network 11 via a corresponding UCN 14 and a corresponding NIM 602. The process controllers 20, 20' interface the analog input and output signals, and digital input and output signals (A/I, A/0, D/I, and D/0, respectively) to the process control system 10 from the variety of field devices (not shown) which include valves, pressure switches, pressure gauges, thermocouples,....

The plant control network 11 provides the overall supervision of the controlled process, in conjunction with the plant operator, and obtains all the information needed to perform the supervisory function, and includes an interface with the operator The plant control network 11 includes a plurality of physical modules, which include a universal operator station (US) 122, an application module (AM) 124, a history module (HM) 126, a computer module (CM) 128, and duplicates of these modules (and additional types of modules, not shown) as necessary to perform the required control/-supervisory function of the process being controlled. Each of these physical modules is operatively connected to a local control network (LCN) 120 which permits each of these modules to communicate with each other as necessary. The NIM 602 and HG 601 provide an interface between the LCN 120 and the UCN 14, and the LCN 120 and the data highway 12, respectively. A more complete description of the plant control network 11, and the physical modules can be had by reference to U.S. Pat. No. 4,607,256, referred to above as related application (h). A more complete description of the process controller 20' can be had by reference to U.S. Pat. No. 4,296,464, referred to above as related application (i).

Referring to FIG. 2 there is shown a block diagram of the process controller 20, ie., the interface apparatus of the present invention. The process controller 20 of the preferred embodiment of the present invention includes a controller A 30 and a controller B 40, which effectively operate as a primary and secondary controller. Controller A 30 and controller B 40 are connected to the UCN 14, the UCN 14 in the preferred embodiment of the present invention comprising for communication redundancy purposes, a UCN(A) 14A and a UCN(B) 14B. Input output (I/O) modules 21 interface to field devices, field devices being various valves, pressure switches, pressure gauges, thermocouples,...which can be analog inputs (A/I), analog outputs (A/0), digital inputs (D/I), and digital outputs (D/0). The controller A 30 interfaces to each I/O module 21 via a bus A 22, and controller B 40 interfaces to each I/O module 21 via a bus B 23. In addition, once again for communication redundancy purposes, controller A 30 is also connected to bus B and controller B 40 is connected to bus A 22.

Controller A and controller B, 30, 40, can communicate with each other via three mediums, the UCN 14, a link 13 between the controllers, and the buses A, B, 22, 23, bus A and bus B in the preferred embodiment of the present invention being serial I/O links. One controller (controller A 30 or controller B 40) operates as a primary controller and the other controller operates as a secondary controller (in more of a reserve mode than a back-up, in that if a failure of controller A 30 should occur, controller B is ready to take over the control function with essentially no start-up or initialization time). On a predetermined time basis, point processing is performed by the controller designated as the primary controller and communicates with the I/O modules 21. In addition, the controller acting as the primary controller communicates with the plant control network 11 reporting status, history, and accepting inputs from the plant control network such as commands from the operator via the universal station 122. In addition, a data base maintained by the primary controller is communicated to the secondary controller via link 13. Updating of the data base in the secondary controller is further described in the aforementioned related applications (a) and (b). In the preferred embodiment, as mentioned above one controller operates as a secondary controller; however, it will be understood by those skilled in the art that a secondary controller is not necessary for the process controller 20. In the preferred embodiment of the present invention, the secondary controller is optional and operates in a mode intended by the invention. It will further be understood by those skilled in the art that various configurations can exist for interfacing the controllers A, B 30, 40 to the UCN 14A, 14B. Controller A 30 can be interfaced to UCN 14A and controller B 40 can be interfaced to UCN 14B; however, in this case a bus (UCN) event that causes UCN A 14A to fail can cause a switch-over to the backup controller, ie., controller B 40. But in the preferred embodiment, controller A 30 is connected to both UCN 14A and 14B. Likewise, controller B 40 is connected to both 14A and 14B. In this configuration, a communication event does not force the system to a processor failover situation.

Referring to FIG. 3, there is shown a block diagram of the controller 30, 40. A modem 50 is connected to the UCN 14, the modem having two inputs, one connected to UCN 14A and the other connected UCN 14B. In preferred embodiment of the present invention, the modem is a Concord Data Systems 5 mega-bit carrier band modem having two ports which allows interfacing with both UCN 14A and UCN 14B. The modem interfaces with a communication unit (COMM) 60 which in turn interfaces with a global memory 70, an I/O interface unit 80, and a control unit 90 via global bus 72. The communication unit 60 includes a communication control unit, in the preferred embodiment a token bus controller (TBC) 61, Motorola type 68824, which is connected to a local bus 62. Connected to the local bus 62 is a processor A 63 (which essentially performs the communication function) and a local memory A 64. The processor A 63 via the TBC 61, communicates with the plant control network 11 via modem 50. The local memory A 64 stores information, including personality image which is downloaded from the plant control network 11, for use by processor A 63 and TBC 61. The global memory 70 stores information which is common to both processors A63 and B 91. It also stores all the data received from bus A 22 and bus B 23. The global memory 70 also serves as an interprocessor communication vehicle between processors A 63 and B 91. Control unit 90 includes a processor B 91 and a local memory B 92. Processor B 91 performs the control function (ie., control processing) relating to the field devices. This essentially includes performing the point processing, and updating the local memory B 92 and global memory 70. Also coupled to the local bus 93 of control unit 90 is a track unit 94 which is utilized to implement the data base transfer via link 13 to the other controller 30, 40 of the process controller 20. A more detailed description of the track unit 94 can be had by making reference to the related patent applications identified above as related applications (a) and (b). The I/O interface unit 80 includes a receiver-transmitter device, in the preferred embodiment of the present invention this device being a UART (Universal Asynchronous Receiver/Transmitter) 81. In the preferred embodiment of the present invention the UART utilized is a circuit within the Intel 80C31 microcontroller. The UART 81 is coupled through drivers 82, 83 to bus A 22 and bus B 23, respectively. (As mentioned previously, control unit 90 can be eliminated, the control processing being performed by another processor within the plant control network 11, such as AM124. In this configuration, the interface apparatus of the present invention functions as a data acquisition unit).

Processor B 91 receives data from the various field devices through global memory 70, performs the necessary point processing and control function, and then updates the local memory B 92 and global memory 70, as required. The communication unit 60, in response to commands from the control unit 90 via global memory 70, inputs and outputs data between the I/O modules 21 (via the I/O interface unit 80) and the global memory 70, thereby relieving the control unit 90 from the burden of I/O module management. In this manner the control processing is performed by the control unit 90 within the process controller 20 for the predefined attached field devices, and the communication (ie., the I/O control) is handled by the communication unit 60 through the UART 81

Referring to FIG. 4 there is shown a block diagram of the I/O module of the preferred embodiment of the present invention. A transceiver (anti-jabber circuit) 201 interfaces with bus A 22 and bus B 23. The transceiver of the preferred embodiment of the present invention is of the type described in the aforementioned related application identified as related application (g) and (f). The transceiver 201 interfaces with a microcontroller (u-controller) 202. In the preferred embodiment of the present invention the microcontroller 202 is of the type, Intel 80C31. The microcontroller is coupled to a local bus 203, and includes an EPROM 204 and a RAM 205 also attached to the local bus 203. The RAM 205 contains the information which forms the database for the I/O module 21. The EPROM 204 contains the program information utilized by the microcontroller 202. (It will be recognized by those skilled the art that the EPROM and RAM comprise a memory unit and any type memory unit which can interface with the microcontroller 202 may be utilized.) Also attached to local bus 203 is an input buffer which receives the I/O link address information from the I/O link (bus A, bus B, 22, 23). Connected to the input buffer (BUFFER IN) 206 is a hardware revision code unit 207 which identifies the hardware and revision of the I/O module 21 which can be read by the microcontroller 202 in order to verify the revision of the hardware The output buffer (BUFFER OUT) 208 is also connected to the local bus 203. The application specific circuits 209 is also connected to the local bus 203 and interfaces with the input and output buffers 206, 208, and the microcontroller 202 via the local bus 203. The application specific circuits vary from I/O module to I/O module depending on the field device to which the I/O module is to be coupled. If the field device is of a type which requires a digital input, then the application specific circuit 209 will include the logic in order to place the digital input into a predefined format which will interface with the remainder of the I/O module. Likewise, if the field device is such that requires an analog input, then the application specific circuit contains a logic which converts the analog input signal (via an A/D converter) into a format again consistent with predefined formats. In this manner, the I/O modules are referred to as a specific I/O module type. The microcontroller 202 performs the I/O processing (or preprocessing) for the application specific circuits 209. The preprocessing will vary from each I/O module 21 depending on the type (ie., A/I, A/0,...) the preprocessing essentially consisting of translating the signals from the application specific circuits to a format compatible with the controller 30, 40 ', and more specifically with control unit 90), and putting the signals from controller 30, 40 in a format compatible with the I/O module 21. Some of the preprocessing performed includes zero drift, linearization (linearizing thermocouples), hardware correction, compensation (gain compensation and zero compensation), reference junction compensation, calibration correction, conversions, checking for alarms (limits)... and generating a signal in a predetermined format having predetermined scale (ie., engineering units, normalized units, percent of scale,...). In the preferred embodiment of the present invention seven types of applications specific circuits are provided for, these include a high level analog input, low level analog input, analog output, digital input, digital output, smart transmitter interface, and pulse input counter. For example, a detailed description of the low level analog input application specific circuit can be had by reference to the related application identified above as related application (c), and also to related applications (d) and (e).

Referring to FIG. 5, there is shown a block diagram of an alternative embodiment of a process control system incorporating the interface apparatus of the present invention. The network interface module (NIM) 602 is coupled to the universal control network (UCN) 14. Also coupled to the UCN 14 is a plurality of process controllers (PC) 20A, 20B, 20N, the interface apparatus of the present invention. The process controllers 20, 20B, ... 20N, can initiate communication to the plant control network 11, or can communicate with any other process controller coupled to UCN 14, unlike the previous process controllers 20', These previous process controllers 20, were slaved to the highway gateway (HG) 601 and could only communicate in response to a message from HG 601. Thus, the process controllers 20A, 20B, 20N, of the present invention provide for "peer-to-peer" communication.

Referring back to FIG. 2 it can be seen that the process controller 20 has a degree of flexibility not heretofore available. If the field devices for the particular process being controlled are all of an analog input type, the I/O modules 21A, 21B, 21C, 21D, can all be the same I/O module type; however, in the preferred embodiment of the present invention, the application specific circuit for the module 21 is changed to properly interface with the signal provided by the field device. In this manner, the process controller 20 is configurable to the field device configuration simply by inserting the correct module, ie., the I/O module type being compatible with the field device. Thus, it can be readily seen that the architecture of the interface apparatus of the present invention allows the user the flexibility of configuring the system to the process being controlled simply by inserting the required I/O modules into slots allocated to receive the I/O modules without any electrical, mechanical, or physical changes to the interface apparatus.

While there has been shown what is considered the preferred embodiment of the present invention, it will be manifest that many changes and modifications can be made therein without departing from the essential spirit and scope of the invention. It is intended, therefore, in the annexed claims to cover all such changes and modifications which fall within the true scope of the invention.

what is claimed is:

1. A method by which redundant network interface modules (NIMs) interconnecting communication buses of a first and second local area network communicate with one another over the communication buses of the first and second local are network whereby each of the redundant NIMs includes a first NIM and a second NIM, the first NIM being designated as the primary and second NIM being designated as the secondary, the secondary NIM taking over the function of the primary NIM on the occurrence of failover conditions; comprising the steps of:

the first and second NIMs communicating with each other at predetermined time intervals over the communication buses of both networks, each communication between the NIMs over the communication bus of the first network including the status of the second network as perceive by the NIM transmitting the message and each communication between the NIMs over the communication bus of the second network including the status of the first network as perceived by the NIM transmitting the message;

the primary NIM failing over to the secondary NIM when the primary NIM determines that it is unable to communicate with the first network and the secondary NIM determines that it is able to communicate with the first network.

2. The method of claim 1 further comprising the step of the secondary NIM terminating its operation if the secondary NIM is unable to communicate with the first network.

3. The method of claim 2 in which each communication between the NIMs includes current operating status of the NIM originating such a communication, and further comprising the step of the secondary NIM terminating its operation if the secondary NIM detects it has suffered a hardware or a software failure.

4. The method of claim 3 further comprising the step of the primary NIM failing over to the secondary NIM if the primary NIM detects it has suffered a hardware or a software failure.

5. The method of claim 4 in which the primary NIM fails over to the secondary NIM without communicating status information in a status message to the secondary NIM that it has suffered a hardware or a software failure.

6. The method of claim 5 in which each of the predetermined time intervals is one second.

7. The method of claim 6 in which the first local area network is a token passing network.

8. The method of claim 7 in which the second local area network is a token passing network.

9. In a process control system including an universal control network (UCN) and a local control network (LCN), each being a local area network (LAN) with each network including a plurality of modules, the modules of the UCN and the modules of the LCN communicating with one another over a communication bus, a pair of network interface modules other NIM being designated as a secondary, each of the NIMs being connected between the communication buses of the UCN and the LCN and functioning to provide communication and data translation between the UCN and the LCN, the primary NIM providing such function unless replaced by the secondary NIM, and the secondary NIM being available to provide this function instead of the primary NIM upon the occurrence of predetermined failover conditions, a method for providing the communication function comprising the steps of:

(a) the secondary NIM transmitting to the primary NIM at least once during every first period of time over the UCN communication bus a status message, the secondary NIM's status message including the current operating status of the secondary NIM and the status of the LCN as determined by the secondary NIM;

(b) the primary NIM transmitting to the secondary NIM at least once during every first period of time over the UCN communication bus a status message, the primary NIM's status message including the current operating status of the primary NIM and the status of the LCN as determined by the primary NIM;

(c) the primary NIM transmitting to the secondary NIM at least once during every first period of time over the LCN communication bus a status message, the primary NIM's status message including current operating status of the primary NIM, of the UCN as determined by the primary NIM, and updating data with which the secondary NIM updates the secondary NIM's data base so that the data base of the secondary NIM substantially matches the that the data base of the secondary NIM substantially matches the data base of the primary NIM;

(d) the secondary NIM transmitting to the primary NIM upon receiving a predetermined number of messages from the primary NIM in step (c) containing updating data or during every first period of time, which ever first occurs, over the LCN communication bus a status message, the secondary NIM's status message including the current operating status of the UCN as determined by the secondary NIM;

(e) the primary NIM failing over tot he secondary NIM if the primary NIM is unable to communicate with the LCN, and the secondary NTM is able to communicate with the LCN and status messages containing such data are received by both NIMs;

(f) the secondary NIM terminating its operations if it determines that it is unable to communicate with the LCN;

(g) the primary NIM terminating operation of the secondary NIM if the secondary NIM is unable to communicate with one of the LANs;

(h) the primary NIM terminating communications with the secondary NIM if the secondary NIM crashes; and (i) the secondary NIM taking over the function of the primary NIM if the primary NIM crashes, if the primary NIM is commanded to shut down by a command from a universal control station module of the first network, or if the primary NIM is powered down.

10. The method of claim 9 in which the first period of time is one second.

11. The method of claim 10 in which the universal control network is a token passing network.

12. The method of claim 11 in which the local control network is a token passing network.

* * * * *

UNITED STATES PATENT AND TRADEMARK OFFICE
CERTIFICATE OF CORRECTION

PATENT NO. : 5,016,244

DATED : May 14, 1991

INVENTOR(S) : Massey, et al

It is certified that error appears in the above-identified patent and that said Letters Patent is hereby corrected as shown below:

The title page should be deleted to appear as per attached title page.

Columns 1-10, should be deleted to be replaced with columns 1-10 as per attached.

Signed and Sealed this

Thirteenth Day of October, 1992

*Attest:*

DOUGLAS B. COMER

*Attesting Officer*     *Acting Commissioner of Patents and Trademarks*

United States Patent [19]
Massey, Jr. et al.

[11] Patent Number: 5,016,244
[45] Date of Patent: May 14, 1991

[54] METHOD FOR CONTROLLING FAILOVER BETWEEN REDUNDANT NETWORK INTERFACE MODULES

[75] Inventors: W. Russell Massey, Jr., Levittown; Renee Drobish, Dresher; Paul F. McLaughlin, Hatfield, all of Pa.

[73] Assignee: Honeywell Inc., Minneapolis, Minn.

[21] Appl. No.: 404,748

[22] Filed: Sep. 8, 1989

[51] Int. Cl.⁵ ............................................. H04J 3/14
[52] U.S. Cl. .................................... 370/16; 370/85.4; 370/85.13; 370/94.3
[58] Field of Search ............... 370/85.4, 85.5, 85.9, 370/85.13, 85.11, 85.14, 85.15, 16, 60, 60.1, 94.1, 94.3; 371/8.1, 11.1; 340/825.01, 827, 825.02, 825.5, 825.51, 825.52

[56] References Cited

U.S. PATENT DOCUMENTS

| | | | |
|---|---|---|---|
| 4,410,983 | 10/1983 | Cope | 370/85.9 |
| 4,596,012 | 6/1986 | Reed | 370/16 |
| 4,797,881 | 1/1989 | Ben-Artzi | 370/85.4 |
| 4,831,617 | 5/1989 | Iwasaki | 370/16 |
| 4,845,609 | 7/1989 | Lighthart et al. | 370/85.4 |
| 4,847,837 | 7/1989 | Morales et al. | 370/16 |

Primary Examiner—Douglas W. Olms
Assistant Examiner—Alpus H. Hsu
Attorney, Agent, or Firm—A. Sapelli; D. Lenkszus; A. Medved

[57] ABSTRACT

A method by which redundant network interface modules (NIMs) interconnecting the communication buses of two local area networks communicate with one another at predetermined time intervals over the communication buses of both networks. A first NIM of a redundant pair of NIMs is designated as the primary and a second NIM of the redundant pair is designated as the secondary. Contents of the information communicated between the NIMs over the communication bus of the first network includes the status of the transmitting NIMs ability to communicate with the second network and the information communicated between the NIMs over the communication bus of the second network includes the status of the transmitting NIM's ability to communicate with the first network. Based on the information exchanged, the failure of the NIMs to communicate as scheduled, and the internal status of each NIM as understood by that NIM, the NIMs decide when failover from the primary NIM to the secondary NIM occurs.

12 Claims, 2 Drawing Sheets

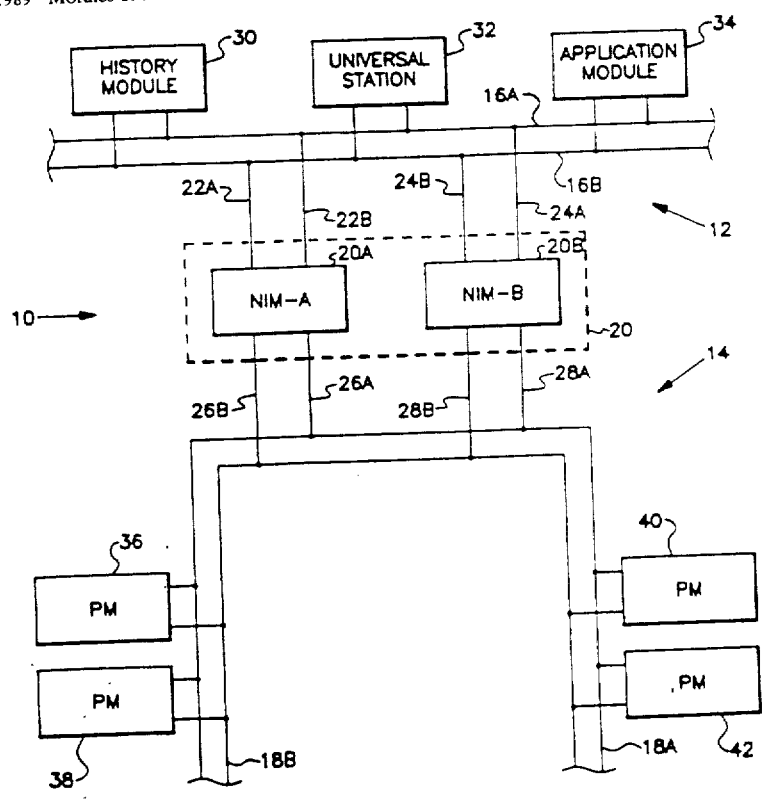

METHOD FOR CONTROLLING FAILOVER BETWEEN REDUNDANT NETWORK INTERFACE MODULES

CROSS-REFERENCE TO RELATED APPLICATIONS

The following copending patent applications relate to the invention of the present application and are incorporated herein by reference:

A. "Method for Control Data Base Updating of a Redundant Processor in a Process Control System" by P. McLaughlin et al, Ser. No. 07/299,859, filed Jan. 23, 1989 which issued on Sep. 18, 1990 as U.S. Pat. No. 4,958,270; and B. "Apparatus for Providing a Universal Interface to a Process Control System" by A. J. Hahn et al, Ser. No. 07/402,954, filed Sep. 5, 1989, the specification of which as filed is set forth in Appendix A of this application.

All of the foregoing are assigned to the same assignee.

BACKGROUND OF THE INVENTION (1) Field of the Invention

This invention is in the field of methods by which the primary and secondary network interface modules determine their respective status and that of the networks with which they communicate to determine when the primary module shall failover in deference to the secondary and in which the secondary module determines that the primary module has failed in order to assume the role of the primary module.

(2) Description of the Prior Art

Process control systems which include a hierarchy of local area networks (LAN)s have been developed. An example of such a system is described and claimed in U.S. Pat. No. 4,607,256, which issued to Russel A. Henzel on Aug. 18, 1986. Another such system is illustrated and described in the cross-referenced application entitled "Apparatus for Providing a Universal Interface to a Process Control System" the disclosure of which is incorporated by reference into this application.

In such systems, network interface modules (NIM)s provide communication and data translation capabilities so that modules of the two networks interconnected by a NIM can communicate. The reliability and fault tolerance of process control systems are significantly increased by incorporating in each network a standby, backup, secondary, or redundant module for each of the operating modules of each network, particularly the NIMs interconnecting the networks, as well as by providing redundant cables over which the modules of each network communicate. Because of the importance of the functions performed by NIMs, providing each NIM of a process control system with a secondary or back up has a high priority. However, there is a need for an improved method by which a primary NIM and secondary NIM of a redundant pair of NIMs in such a system communicate, and the information communicated so that both NIMs have the capability of knowing each others status and of determining, or of controlling, when the secondary NIM will take over the function of the primary NIM; or, stated another way, when the primary NIM will failover to the secondary NIM.

SUMMARY OF THE INVENTION

The present invention provides a method for communicating the respective status of redundant network interface modules (NIM)s between the modules and for controlling failover between the (NIM)s, one of which is designated as the primary NIM and the other as the secondary NIM. The NIMs are connected between the communication media of two local area networks (LAN)s so that the primary NIM can provide communication and data translation between the networks as required so that modules of one network can communicate with modules on the other. The secondary NIM of the redundant pair is available to provide the functions of the primary whenever failure of the primary NIM or failover of the primary NIM to the secondary NIM occurs. The primary and secondary NIMs communicate with each other at regular time intervals over the communication buses of both networks. The information communicated is in the form of messages, more accurately status messages, which include the status of the networks interconnected by the NIMs as perceived by each. The status messages transmitted by each NIM to the other over the communication bus of the first network includes the status of the NIM transmitting the information, the status of the second network as perceived by the transmitting NIM, and other information or data as required. The status messages transmitted by each NIM to the other over the communication bus of the second network include the status of the NIM transmitting the information, the status of the first network as perceived by the transmitting NIM as well as other information, or data, as required.

Communication of the NIMs with one of the networks, such as the first, will take priority over communication with the second for reasons explained later. Some examples of the conditions resulting in failover of the primary NIM to the secondary NIM are: the primary NIM crashes, or fails; the primary NIM is unable to communicate with the first network and the secondary can; the primary NIM is unable to communicate with the second network, but otherwise is functioning properly, and the secondary NIM can communicate with both the first and second networks and the secondary NIM is otherwise functioning properly. Failover of the primary NIM to the secondary NIM will not occur if the secondary NIM is unable to communicate with either the first or second network, or if the secondary NIM has an internal problem which prevents its proper operation, such as a hardware or software failure which has caused the secondary NIM to perform improperly, or to crash.

It is therefore an object of this invention to provide an improved method by which redundant network interface modules interconnecting the communication buses of two local area networks determine when the primary NIM shall failover to the secondary NIM based on information exchanged between the two modules over the media of the two networks.

It is another object of this invention to provide an improved method by which redundant network interface modules interconnecting the communication buses of two local area networks determine when the primary shall fail over to the secondary without requiring any dedicated redundancy hardware.

It is still another object of this invention to provide an improved method for controlling failover of a primary network interface module to the secondary network interface module in a process control system.

It is yet another object of this invention to provide an improved method for controlling failover of a primary network interface module to the secondary network module in a process control system within a predetermined period of time after the occurrence of a fault causing failover to prevent interrupting the process being controlled by the system.

BRIEF DESCRIPTION OF THE DRAWINGS

Other objects, features and advantages of the invention will be readily apparent from the following description of a preferred embodiment thereof, taken in conjunction with the accompanying drawings, although variations and modifications may be affected without departing from the spirit and scope of the novel concepts of the disclosure, and in which:

FIG. 1 is a schematic block diagram of a process control system, the two local area networks of which are provided with redundant network interface modules which practice the method of this invention.

FIG. 2 is a truth table of conditions that determine when failover of the primary NIM to the secondary NIM occurs, when the secondary NIM terminates operation, and when no action takes place.

DETAILED DESCRIPTION

In FIG. 1, process control system 10 includes local control network (LCN) 12, only a portion of which is illustrated, and universal control network (UCN) 14. LCN 12 includes a communication bus 16, which in the preferred embodiment comprises redundant coaxial cables 16A and 16B, and UCN 14 also includes a communication bus 18 which in the preferred embodiment also comprises redundant coaxial cables 18A and 18B. Communication between LCN 12 and UCN 14 is provided by redundant network interface modules (NIM)s 20, which includes a pair of NIMs, 20A and 20B, with only one of the NIMs, such as NIM-A 20A providing such function as well as a data translation function at a given period of time. Under such circumstances, NIM-A is designated as the primary and NIM-B 20B which has the same capabilities as NIM 20A, is designated as the secondary NIM since NIM-B is the backup for NIM-A 20A. NIM-A is directly connected to dual redundant cables 16A and 16B by redundant connectors 22A and 22B, and NIM-B is directly connected to cables 16A and 16B by connectors 24A and 24B. NIMs 20, in the preferred embodiment, are connected to redundant cables 18A and 18B of UCN 14, by drop cables 26A and 26B for NIM-A and drop cables 28A and 28B for NIM-B.

The modules of LCN illustrated in FIG. 1 include a history module 30, a universal operator station module 32 and an application module 34. Universal operator station module 32 is the work station for one or more plant operators and provides the interface between the plant operator, or operators, and the process or processes of a plant for which the operators are responsible and which processes they monitor and control through the facilities and information provided by control system 10. For a more detailed description of LCN 12 and of modules 30, 32, and 34 as well as other modules of LCN 12 which are not illustrated, reference is made to the teaching of U.S. Pat. No. 4,607,256.

UCN 14 is provided with process manager modules (PM)s 36, 38, 40, and 42. For a more complete description of the structure and functions of NIMs 20 and PM modules 36, 38, 40, and 42 reference is made to the applications more completely identified in the section of this application entitled Cross-Reference to Related Patent Applications. In the preferred embodiment, PM modules 36, 38, 40, and 42 provide control functions and also function as network interface modules between UCN 14 and input output networks which include input output (IO) modules. The IO modules which are not illustrated translate analog or digital input data produced by devices such as valves, pressure switches, pressure gauges, thermocouples, and the like into signals compatible to a process module such as PM 36, and translate signals produced by a process modules such as PM 36 to analog or digital output signals compatible to such devices.

In the preferred embodiment, both LCN 12 and UCN 14 are token passing local area networks (LAN)s typically with each module having a secondary or backup module available to take over for the primary module of a redundant pair. For example in LCN 12 history module 30, universal station module 32 and application module 34 each would normally be provided with a back up module to provide redundancy. LCN 12 may be provided with additional modules of the same or different types as is well known but which are not illustrated. In UCN 14 process modules 36, 38, 40, and 42 would normally be provided with a back up, or standby, module, but such redundant modules are not illustrated in FIG. 1.

The primary function of NIMs 20A and 20B is to provide communications between LCN 12 and UCN 14. The ability of NIMs 20A and 20B, particularly primary NIM-A to communicate with the modules of LCN 12 is a key criteria in determining when primary NIM-A fails over to its secondary NIM-B. The ability of the NIMs 20A and 20B to communicate with LCN 12, particularly with universal station module 32 is important because module 32 provides the operators of the process controlled by process control system 10 with a vantage point, or window, to observe, or monitor the process being controlled and how process control system 10 is functioning. More particularly, module 32 provides the operators with information identifying when and where faults occur in the communication media or modules of any of the networks with which universal station module 32 can communicate. Whenever a fault occurs and wherever it occurs, the responsibility of the operators of the process being controlled by system 10 is to take appropriate steps to find and fix the fault as quickly as possible.

Since the communication media of both LCN 12 and UCN 14 are redundant coaxial cables, a fault or faults limited to one of the two cables of either or both networks, will not normally interfere with communications between LCN 12 and UCN 14 because each network has the capability for detecting faults in their redundant communication cables and of switching from the faulty cable to the redundant, or back up, cable.

In the normal operation of plant control system 10 when all the modules and communication cables of both networks are functioning properly, i.e., without any faults and both the primary NIM-A and the secondary NIM-B are both functioning without fault and no faults are present in any of their drop cables 22, 24, 26, 28. Under such circumstances, secondary NIM-B will transmit a status message to primary NIM-A at least once a second over bus 18 of UCN. This status message includes NIM-B's status, i.e. has NIM-B detected that it has suffered a hardware failure or a software failure; has NIM-B received a status message from primary NIM-A within the past one second over communication bus 18 of UCN 14; and whether secondary NIM-B is receiving signals from other modules of UCN 14. The receipt of such signals signifies that NIM-B can communicate with UCN 14 and that therefore UCN 14 is functioning properly as perceived by NIM-B.

NIM-A transmits at least once to NIM-B a status message which includes the hardware and software status of NIM-A; whether NIM-A has received a status message from NIM-B within the previous second over communication bus 18, and whether NIM-A is receiving messages from and transmitting messages to other modules of LCN 12.

Primary NIM-A will transmit a similar status message to NIM-B over the LCN's communication bus 16 except that this message from NIM-A will include information as to whether NIM-A has received a status message from NIM-B within the past one second over communication bus 16 of LCN 12 and the status of UCN 14 as perceived by NIM-A; namely, that NIM-A is communicating with other modules of UCN 14. In addition this status message may include data which NIM-B uses to update its data base so that the data base of NIM-B is substantially the same as that of primary NIM-A. This facilitates NIM-B's being able to assume the functions of NIM-A with a minimum of delay upon a failover. This message sent by NIM-A to NIM-B over bus 16 is sometimes referred to as a redundancy message.

NIM-B will transmit a status message to NIM-A over communication bus 16 including NIM-B's status and that of UCN 14 as perceived by NIM-B after receiving a predetermined number of redundancy messages from NIM-A over communication bus 16, such as twenty, or at least once every second.

The type of failures, or faults, that can result in NIM-A failing over to NIM-B are: if NIM-A suffers a hardware failure or a software failure; if NIM-B does not receive a status message from NIM-A over buses 16 or 18 of LCN 12 or UCN 14 for 2.5 seconds in the preferred embodiment; if NIM-A is unable to transmit a status message to NIM-B and receive a response from NIM-B over communication bus 16 of LCN 12 within 60 seconds; and NIM-A is unable to communicate with any module of UCN 14 for more than 12 seconds and NIM-B is able to so communicate.

NIM-B is deemed to have a failure if it has a hardware or software fault; if NIM-A does not receive at least one status message from NIM-B over either communication bus 16 of LCN 12 or communication bus 18 of UCN 14 during the previous 60 seconds; or if NIM-B does not receive any status messages from NIM-A over bus 16 of LCN 12 for a period of 2.5 seconds but can receive messages from NIM-A over communication bus 18 of UCN 14.

FIG. 2 is a truth table describing the actions taken by NIMs 20A and 20B upon the occurrence of certain conditions to minimize the consequences of such occurrences upon the operation of process control system 10. Row 1 describes the situation when both LCN 12 and UCN 14 are operating properly and neither primary NIM-A nor secondary NIM-B has a hardware or software failure that prevents it from operating properly.

The situation described in row 2 is one in which primary NIM-A is unable to transmit or receive signals from the communication media 18 of UCN 14. Such a situation can occur if both of its drop cables 26A and 26B have been severed, for example. This occurrence is detected in the following way. NIM-B will transmit to NIM-A over bus 18 of UCN 14 a status message which includes data signifying that NIM-B's status is all right, as is that of LCN 12, and that NIM-B has received a status message from NIM-A over LCN bus 16. Since NIM-A is unable to receive a status message from NIM-B over UCN bus 18 because drop cables 26A and 26B are severed, the failure of NIM-A to receive a status message from NIM-B or to communicate with any other module of UCN 14 for one second results in NIM-A recognizing that it has an UCN failure. NIM-A will transmit a redundancy message to NIM-B over LCN bus 16 at least once a second which message contains data informing NIM-B that NIM-A is isolated from UCN 14. NIM-B will transmit status messages to NIM-A over LCN bus 16 periodically at least once per second. After a 500 msec. delay, NIM-B listens to UCN bus 18 for a message from NIM-A. After five such attempts, NIM-B sends a message to NIM-A over LCN bus 16 commanding NIM-A to terminate operations, and NIM-B takes over the functions of NIM-A. NIM-B will then transmit a message to universal station 32 concerning what has happened so that the operators of the process can take appropriate action to correct the problem, in this case, severed drop cables 26A and 26B.

The conditions described in row 3 are similar to those of row 2 except that secondary NIM-B is unable to communicate over UCN bus 18 because its drop cables 28A and 28B are severed, for example. NIM-B will attempt to transmit a status message over UCN bus 18. NIM-A, since it did not receive a status message from NIM-B within the past second, does not send a status message to NIM-B over UCN bus 18. NIM-A will send a redundancy message to NIM-B over LCN bus 16 informing NIM-B that NIM-A did not receive a status message from NIM-B over bus 18 within the allotted time period, one second. NIM-B will then transmit a status message to NIM-A over LCN bus 16 containing data that NIM-B is unable to communicate with any modules of UCN 14. NIM-A after thirty attempts to receive a message from NIM B over bus 18, NIM-A will send a message to NIM-B over LCN bus 16 for NIM-B to terminate its operations. NIM-B will in the mean time retry five times to send a status message to NIM-A over bus 18. If NIM-B does not receive a message from NIM-A over bus 18 of UCN 14 after five tries, NIM-B will terminate its operations. Thus, NIM-B under these circumstances is terminated by NIM-A or by its own decision.

The conditions described in row 4 of FIG. 2 arise if the connectors 22A 22B of NIM-A fail. The transmission of status messages between NIM-B and NIM-A is as described above with respect to messages transmitted over UCN bus 18. However, when primary NIM-A attempts to send the usual redundancy message to NIM-B after connectors 22A and 22B fail, NIM-A is unable to do so even though it tries at least once every second. Since the redundancy message normally transmitted by NIM-A to NIM-B over LCN bus 16 is not received by NIM-B, NIM-B after 1.7 seconds have elapsed begins transmitting requests to NIM-A over LCN bus 16 for NIM-A to retransmit its redundancy message over bus 16. This request is repeated three times. If no response to its requests are received by NIM-B after 0.8 seconds after the third request was transmitted, NIM-B will have received a status message from NIM-A over bus 18 of UCN that NIM-A is unable to communicate with any of the modules of LCN 12. NIM-B will then send a message to NIM-A over UCN bus 18 telling NIM-A to terminate operations since it is unable to communicate with LCN 12. Upon the receipt of such a message, NIM-A terminates operation and failover to NIM-B occurs. NIM-B will then notify module 32 of LCN 12 what has occurred.

The circumstances described by row 5 of FIG. 2 occur if the drop cables 24-A and 24-B of NIM-B are cut are severed. When NIM-B transmits its status on LCN 12 to NIM-A over UCN bus 18, it will report that it is unable to communicate with any of the modules of LCN 12. NIM-A will transmit its status message once a second to NIM-B over UCN bus 18 to the effect that in so far as NIM-A is concerned, it can communicate with LCN 12 but not with NIM-B. NIM-A will attempt to transmit its redundancy message to NIM-B over LCN bus 16. Since NIM-B can not receive this message, NIM-B will after 1.7 seconds has elapsed, transmit three requests to NIM-A to resend the redundancy message over LCN bus 16. NIM-B waits for another 0.8 seconds and if NIM-B does not receive the requested message from NIM-A during that period, NIM-B concludes that it can not communicate with modules on LCN 12. Since NIM-B has received a status message from NIM-A that NIM-A can communicate with the modules of LCN 12, NIM-B terminates its operations. NIM-A then notifies universal station module 32 of LCN 12 of the state of affairs.

The situation described by row 5, of FIG. 2 can also occur if NIM-B should suffer a transmitter failure which is not detected and therefore is not reported as a hardware failure. Under such circumstances, NIM-B will transmit a routine status message to NIM-A including the status of LCN 12 as perceived by NIM-B at least once a second over bus 18. NIM-A will transmit a routine status message to NIM-B including the status of LCN 12 as perceived by NIM-A over bus bus 18. Primary NIM 20A will send a normal redundancy message to secondary NIM 20B over LCN bus 16. While NIM-B can receive this redundancy message from NIM-A, it cannot transmit an appropriate status message to NIM-A over LCN bus 16. If primary NIM 20A does not receive a proper message from NIM-B over LCN bus 16 for 60 seconds, NIM-A will transmit a message to NIM-B over UCN bus 18 telling NIM-B to terminate its operations.

Row 6 describes the action taken by secondary NIM-B if NIM-B is unable to communicate with modules of the LCN. The action taken by NIM-B is to terminate its operation even though NIM-A is unable to communicate properly with modules of UCN 14 and NIM-B can. If both of the NIMs 20A and 20B are unable to communicate with LCN 12, no action is taken, row 7. If primary NIM 20A suffers an LCN failure and secondary NIM 20B an UCN failure, primary NIM 20A fails over to secondary NIM 20B, the situation described in row 8. If both NIM-A and NIM-B have an UCN failure, then no action is taken, row 9. If NIM-B is unable to communicate with modules on either LCN 12 and UCN 14, the situation described in row 10, NIM-B terminates operation. Row 11 describes the situation where NIM-A can communicate only with LCN 12 and NIM-A can not communicate with either the LCN 12 or the UCN 14. Under such circumstances NIM-B terminates its operations. If neither NIM-A nor NIM-B can communicate with with either LCN 12 or UCN 14, then nothing can be done, the situation described by row 12. With respect to the situations described in rows 7, 9 and 12, the most probable cause of both NIMs being unable to communicate with the LCN network, row 7; with the UCN network, row 9; or with both networks, row 12; is that both NIMs have been manually disconnected from the communication cables of the indicated network, or networks. Therefore, the two NIMs wait to be manually reconnected to the communication cables of the LCN, or the UCN, or both, and then resume operations.

Row 13 describes the situation that occurs when NIM-A cannot communicate with either LCN 12 or UCN 14 but NIM-B can communicate with LCN 12 but not UCN 14. If this happens, NIM-A will failover to NIM-B. If NIM-A can not communicate with either LCN 12 or UCN 14, but NIM-A can, then NIM-A will failover to NIM-B, row 14. If NIM-A has a hardware or software failure that causes it to crash, then NIM-A will failover to NIM-B, row 15. If NIM-B has a hardware or software failure that causes NIM-B to crash, NIM-A will stop trying to communicate with NIM-B, row 16.

If both trunk cables 16A and 16B of LCN 12 are severed between NIM 20A and NIM 20B, both NIM-A and NIM-B can communicate with some of the modules of LCN 12 but not with each other over bus 16. When this occurs NIM-B will transmit the normal status message including the status of LCN 12 to NIM-A over UCN bus 17 at least once a second. NIM-A will transmit the usual status message including the status of LCN 12 to NIM-B over UCN bus 18 at least once a second. NIM-A will transmit the usual redundancy message including the internal status of NIM-A, the status of UCN 14 as perceived by NIM-A and any update data NIM-A has for NIM-B to NIM-B over LCN bus 16. Since NIM-B is unable to receive this message because of the cable fault in communication cables 16A and 16B, NIM-B after 1.7 seconds has elapsed, transmits three requests to NIM-A over LCN bus 16 requesting NIM-A to re-send the redundancy message over LCN cables 16A and 16B. If NIM-B does not receive a redundancy message from NIM-A within 0.8 seconds after transmitting the third request for NIM-A to do so, and based on status messages from NIM-A received over UCN bus 18, NIM-B determines that NIM-A can communicate with at least some modules of LCN 12. NIM-B then terminates its operation. Row 17 of the truth table of FIG. 2 describes this situation.

From the foregoing, it is believed to be obvious that this invention provides an improved method by which redundant network interface modules interconnecting the communication buses of two local area networks can determine when the primary is to fail over to the secondary based on information exchanged between the modules over the media of the two networks.

What is claimed is:

1. A method by which redundant network interface modules (NIMs) interconnecting communication buses of a first and second local area network communicate with one another over the communication buses of the first and second local area network, whereby each of the redundant NIMs includes a first NIM and a second NIM, the first NIM being designated as the primary and second NIM being designated as the secondary, the secondary NIM taking over the function of the primary NIM on the occurrence of failover conditions; comprising the steps of:
the first and second NIMs communicating with each other at predetermined time intervals over the communication buses of both networks, each communication between the NIMs over the communication bus of the first network including the status of the second network as perceive by the NIM transmitting the message and each communication between the NIMs over the communication bus of the second network including the status of the first network as perceived by the NIM transmitting the message;

the primary NIM failing over to the secondary NIM when the primary NIM determines that it is unable to communicate with the first network and the secondary NIM determines that it is able to communicate with the first network.

2. The method of claim 1 further comprising the step of the secondary NIM terminating its operation if the secondary NIM is unable to communicate with the first network.

3. The method of claim 2 in which each communication between the NIMs includes current operating status of the NIM originating such a communication, and further comprising the step of the secondary NIM terminating its operation if the secondary NIM detects it has suffered a hardware or a software failure.

4. The method of claim 3 further comprising the step of the primary NIM failing over to the secondary NIM if the primary NIM detects it has suffered a hardware or a software failure.

5. The method of claim 4 in which the primary NIM fails over to the secondary NIM without communicating status information in a status message to the secondary NIM that it has suffered a hardware or a software failure.

6. The method of claim 5 in which each of the predetermined time intervals is one second.

7. The method of claim 6 in which the first local area network is a token passing network.

8. The method of claim 7 in which the second local area network is a token passing network.

9. In a process control system including an universal control network (UCN) and a local control network (LCN), each being a local area network (LAN) with each network including a plurality of modules, the modules of the UCN and the modules of the LCN communicating with one another over a communication bus, a pair of network interface modules other NIM being designated as a secondary, each of the NIMs being connected between the communication buses of the UCN and the LCN and functioning to provide communication and data translation between the UCN and the LCN, the primary NIM providing such function unless replaced by the secondary NIM, and the secondary NIM being available to provide this function instead of the primary NIM upon the occurrence of predetermined failover conditions, a method for providing the communication function comprising the steps of:

a) the secondary NIM transmitting to the primary NIM at least once during every first period of time over the UCN communication bus a status message, the secondary NIM's status message including the current operating status of the secondary NIM and the status of the LCN as determined by the secondary NIM;

b) the primary NIM transmitting to the secondary NIM at least once during every first period of time over the UCN communication bus a status message, the primary NIM's status message including the current operating status of the primary NIM and the status of the LCN as determined by the primary NIM;

c) the primary NIM transmitting to the secondary NIM at least once during every first period of time over the LCN communication bus a status message, the primary NIM's status message including current operation status of the primary NIM, of the UCN as determined by the primary NIM, and updating data with which the secondary NIM updates the secondary NIM's data base so that the data base of the secondary NIM substantially matches the that the data base of the secondary NIM substantially matches the data base of the primary NIM;

d) the secondary NIM transmitting to the primary NIM upon receiving a predetermined number of messages from the primary NIM in step (c) containing updating data or during every first period of time, which ever first occurs, over the LCN communication bus a status message, the secondary NIM's status message including the current operating status of the UCN as determined by the secondary NIM;

e) the primary NIM failing over to the secondary NIM if the primary NIM is unable to communicate with the LCN, and the secondary NTM is able to communicate with the LCN and status messages containing such data are received by both NIMs;

f) the secondary NIM terminating its operations if it determines that it is unable to communicate with the LCN;

g) the primary NIM terminating operation of the secondary NIM if the secondary NIM is unable to communicate with one of the LANs;

h) the primary NIM terminating communications with the secondary NIM if the secondary NIM crashes; and i) the secondary NIM taking over the function of the primary NIM if the primary NIM crashes, if the primary NIM is commanded to shut down by a command from a universal control station module of the first network, or if the primary NIM is powered down.

10. The method of claim 9 in which the first period of time is one second.

11. The method of claim 10 in which the universal control network is a token passing network.

12. The method of claim 11 in which the local control network is a token passing network.

* * * * *